United States Patent [19]
Hutson, Jr.

[11] 3,907,918

[45] Sept. 23, 1975

[54] PROCESS FOR REDUCING THE INDUCTION PERIOD OF OXYDEHYDROGENATION CATALYSTS

[75] Inventor: Tom Hutson, Jr., Bartlesville, Okla.

[73] Assignee: Phillips Petroleum Company, Bartlesville, Okla.

[22] Filed: Apr. 9, 1973

[21] Appl. No.: 349,245

Related U.S. Application Data

[63] Continuation of Ser. No. 126,714, March 22, 1971, abandoned.

[52] U.S. Cl. .............................................. 260/680 E
[51] Int. Cl.² .......................................... C07C 5/18
[58] Field of Search ................................. 260/680 E

[56] References Cited
UNITED STATES PATENTS

| | | |
|---|---|---|
| 2,370,513 | 2/1945 | Amos et al. ...................... 260/680 D |
| 2,945,900 | 7/1960 | Alexander et al. ............... 260/680 E |
| 3,375,291 | 3/1968 | Callahan et al. ................. 260/680 E |
| 3,383,429 | 5/1968 | Noddings ......................... 260/680 D |
| 3,414,631 | 12/1968 | Grasselli et al. ................. 260/680 E |
| 3,501,547 | 3/1970 | Nolan et al. ..................... 260/680 E |
| 3,764,632 | 10/1973 | Takenaka et al. ............... 260/680 E |

Primary Examiner—Paul M. Coughlan, Jr.

[57] ABSTRACT

A process for oxidatively dehydrogenating olefins in which that period for bringing the catalyst to its steady-state level of activity is shortened by initiating operations with the catalyst at steam to olefin ratios greater than 45 to 1.

7 Claims, 1 Drawing Figure

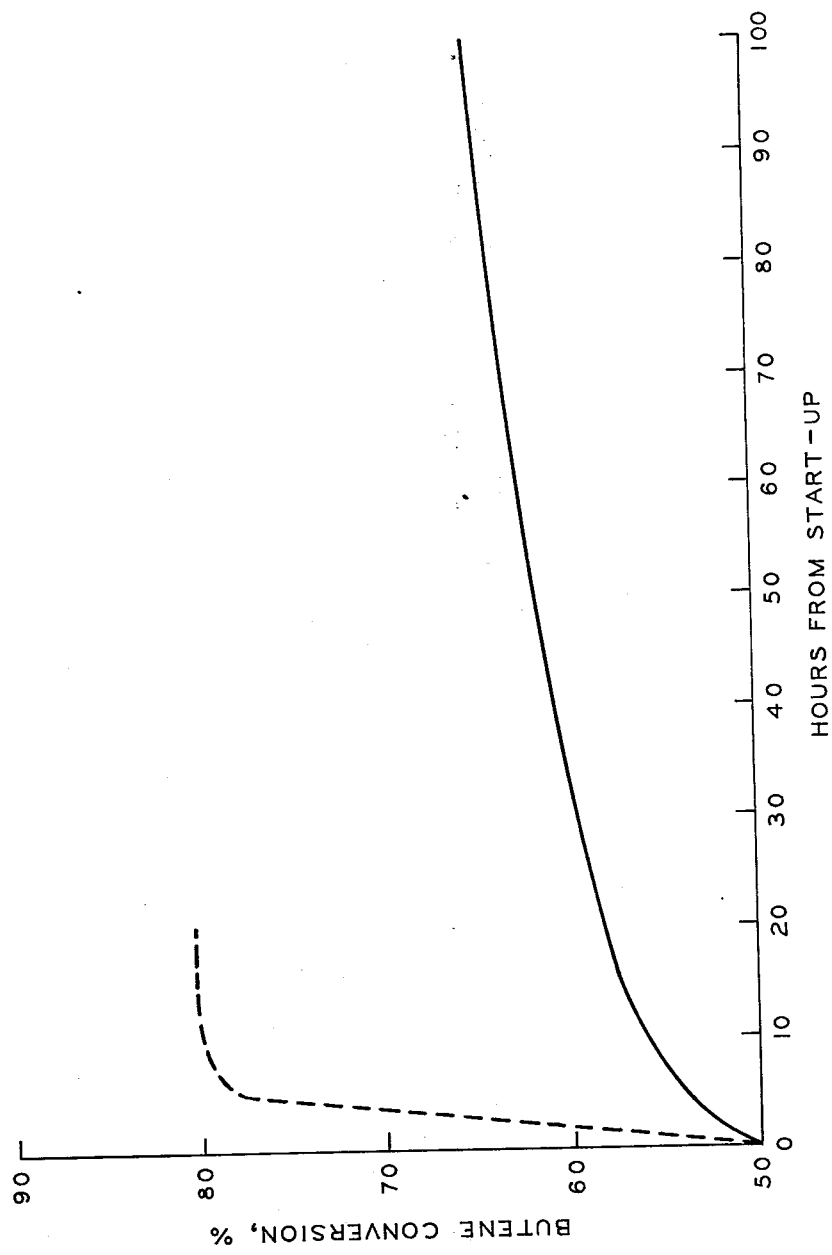

PROCESS FOR REDUCING THE INDUCTION PERIOD OF OXYDEHYDROGENATION CATALYSTS

This application is a continuation of application Serial No. 126,714, filed Mar. 22, 1971, now abandoned.

This invention relates to oxydehydrogenation.

In one of its more specific aspects, this invention relates to a process for reducing the induction period of catalysts employed in oxydehydrogenation.

The process of oxidatively dehydrogenating olefins containing at least four carbon atoms to produce conjugated diolefins is known. In that process, an olefin, oxygen, and steam are contacted with a catalyst at elevated temperatures. Generally, in preferred steady-state operation, that is, production operations after start-up, steam, olefin and oxygen are charged to the catalyst in ratios of from about 10 to 1 to 1, respectively, to about 50 to 1 to 1, respectively, with ratios of from about 25 to 1 to 1 to about 45 to 1 to 1, respectively, being most frequently employed at a reaction temperature within the range of about 800° F. to about 1200° F., at pressures up to about 3 atmospheres and at contact times of from about 0.1 to about 10 seconds.

Various commercial catalysts can be employed in the process. The prior art practice is to start up the process and to bring these catalysts up to conditions of steady-state operating conditions within the aforementioned ranges by introducing into contact with the catalyst the steam, olefin and oxygen in ratios at any level within the aforementioned ranges and to maintain substantially these ratios throughout the life of the catalyst. That is, it is conventional in the prior art to operate the process at a prescribed level of conditions in order to place the unit in operation and to maintain substantially these conditions after steady-state operations have been reached.

It is recognized that oxydehydrogenation catalysts have low conversions and low selectivities under any operating conditions when first placed in service. Accordingly, it has become customary to accept a period of low conversion and low selectivities during this "induction period," after which conversion and selectivities attain more commercially-acceptable levels. Since this "induction period" can be of considerable duration, appreciable production can be lost. This invention provides a method of shortening that induction period.

According to this invention there is provided a method for the catalytic oxidative dehydrogenation of olefins containing at least four carbon atoms which comprises contacting the catalyst with steam, an olefin and oxygen under substantially steady-state conditions to produce conjugated diolefins, said catalyst having been brought to steady-state conversion by contact with steam and an olefin at a steam to olefin ratio greater than 45 to 1.

The attached FIGURE graphically presents a comparison of the method of this invention with the prior art.

By steady-state conditions and steady-state operations are meant those conditions and operations which are employed after the induction period of the catalyst, that is, that period during which the catalyst is put into service and during which induction period the catalyst reaches its conventional level of activity. This is not to imply that the activity of the catalyst is constant at steady-state operations, although its activity increases during the induction period.

The method of this invention is applicable to any oxydehydrogenation catalyst which requires an induction period prior to reaching maximum conversion and selectivity. The method of this invention is particularly applicable to use with lithium-promoted tin-phosphate catalysts containing from about 10 to about 12 weight percent phosphorous and about 1 to 2 weight percent lithium. This catalyst is usually employed in the form of pellets and, under usual start-up conditions, which are within the aforestated ranges of steady-state operation, can require an induction period in excess of 400 hours.

The method of this invention is simply carried out. The catalyst is placed in initial operation in the usual manner except that instead of the induction period being conducted at steam to olefin molar ratios indiscriminately within the steady-state operating range of about 10 to 1 to about 50 to 1, the induction period is conducted at steam to olefin ratios of greater than 45 to 1 and preferably at ratios from about 45 to 1 to about 60 to 1. In other words, the catalyst induction procedure of the present invention is comparable to the prior art catalyst induction procedure except that steam to olefin ratio of a critical level is employed at least until the catalyst has attained steady-state selectively and conversion. That critical steam to olefin molar ratio is one greater than 45 to 1, including ratios of 45 to 1 to 60 to 1, and 52 to 1 to 60 to 1, as well as about 60 to 1. After the attainment of steady-state selectivity and conversion, the steam to olefin molar ratio can be reduced to values more closely approaching the middle of the accepted operating range, which ranges are generally accepted as being more economically feasible.

Operating conditions in accordance with the method of this invention can be expected to reduce the catalyst induction period by as much as 90 percent. This is evidenced by the following example which compares the length of the induction period of similarly prepared catalysts.

EXAMPLE

Two samples of a similarly-prepared lithium-promoted tin catalyst containing 58 weight percent tin, 10 weight percent phosphorous and 1.39 weight percent lithium were individually placed in operation by individual procedures, the first being the conventional method employing a steam to olefin ratio of about 30 to 1 and the second being in accordance with the method of this invention, and employing a steam to olefin ratio of 50 to 1.

In both instances, the olefin was butene. In both instances, oxygen was present in the steam-olefin mixture, it being present in the relative amounts in respect to the butene in both procedures. Similarly, in each procedure, the residence time was 0.6 sec. and the outlet temperature from the catalyst bed was 1100° F.

Comparative values of butadiene selectivity, based on the gas phase, and butene conversion, at the indicated intervals after start-up were as follows:

| Procedure Hours from Start up | I (Prior Art) Conversion % | I (Prior Art) Selectivity % | II (Invention) Conversion % | II (Invention) Selectivity % |
|---|---|---|---|---|
| 5 | 54 | 91 | 77.6 | 93.5 |
| 10 | 56 | | 79.8 | |
| 15 | 57 | | 80.3 | |

-Continued

| Procedure Hours from Start up | I (Prior Art) Conversion % | Selectivity % | II (Invention) Conversion % | Selectivity % |
| --- | --- | --- | --- | --- |
| 25 | 58.5 | | 80.3 | |
| 40 | 61 | | — | |
| 55 | 62 | | — | |
| 70 | 63 | | — | |
| 85 | 64 | | — | |
| 100 | 65 | 91.3 | — | 93.5 |
| 200 | 70.5 | | — | |
| 300 | 75.5 | | — | |
| 400 | 76 | 92.0 | — | 93.5 |

While slight differences exist in the conditions under which the two runs were conducted, these differences are not believed to contribute in any appreciable extent to the difference in the length of time required by the two procedures for attaining substantially steady-state conversion and selectivity.

Summarily, the above data indicate that the method of this invention caused the catalyst to reach steady-state conversion in about 15 hours, a decrease of some 385 hours from that period required by the prior art method.

The above data are graphically presented in the attached figure over a principal portion of the ranges concerned. These data indicate that the method of this invention, if continued over the period of 400 hours, will produce an average butene conversion of about 80.3 percent. In contrast, the method of the prior art, during the first 400 hours of operation, produces an average butene conversion of only about 69.6 percent. This is an increase of about 15 percent. However, in terms of production, this would be equivalent to about 10 BPH production for about 400 hours. Accordingly, the method of the present invention has decided economic advantages.

Sometime after having reached steady-state operation, the steam to olefin ratio employed in the second procedure was reduced to a more economical ratio of about 35 to 1, a ratio well within the range of steady-state operations. Thereupon, the butene conversion decreased to less than 75 percent. This would seem to indicate that the catalyst employed in the second procedure was, for some reason, a less active catalyst than that catalyst employed in the first procedure. The fact that the method of the present invention so drastically decreased the induction period of the less active catalyst in comparison to that induction period required by the more active catalyst further emphasizes the drastic improvement in the oxydehydrogenation process resulting from the method of the present invention.

It is appreciated that various modifications can be made to the method of this invention. However, such are considered to be within the scope of the invention.

What is claimed is:

1. A process for oxidatively dehydrogenating olefins containing at least four carbon atoms which comprises contacting a catalyst with steam, an olefin and oxygen under steady-state dehydrogenating conditions to produce conjugated diolefins, said catalyst having been brought to a steady-state rate of conversion by contacting said catalyst with steam and olefins at an induction steam to olefin molar ratio greater than 45 to 1 and said dehydrogenating being conducted at steady-state conditions at a steam to olefin molar ratio less than said induction steam to olefin ratio within the range of from about 25 to 1 to about 45 to 1.

2. The method of claim 1 in which said induction steam to olefin molar ratio is within a range up to about 60 to 1.

3. The method of claim 1 in which said induction steam to olefin molar ratio is about 50 to 1.

4. The method of claim 1 in which said dehydrogenating is conducted at steady-state conditions at a steam to olefin molar ratio of about 35 to 1.

5. The method of claim 2 in which dehydrogenating is conducted at steady-state conditions at a steam to olefin molar ratio of about 35 to 1.

6. The process of claim 1 in which said catalyst is brought to said steady-state rate at an induction steam to olefin molar ratio in the range of from about 52 to 1 to about 60 to 1.

7. The process of claim 1 in which said catalyst is brought to said steady-state rate at an induction steam to olefin molar ratio of about 60 to 1.

* * * * *